United States Patent Office 2,969,213
Patented Jan. 24, 1961

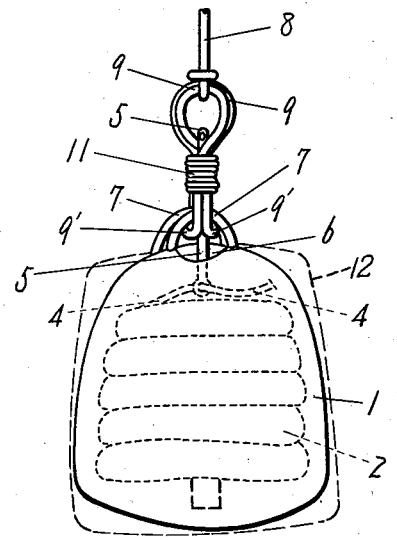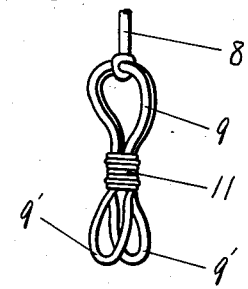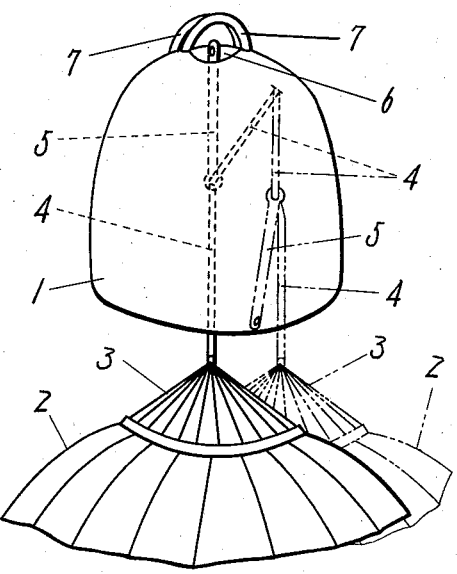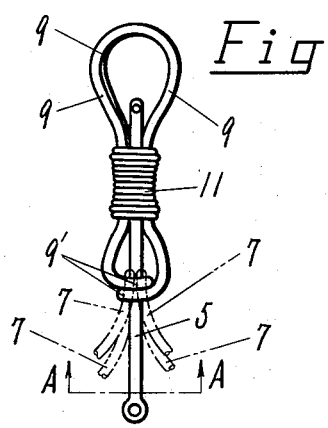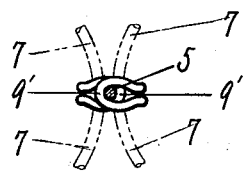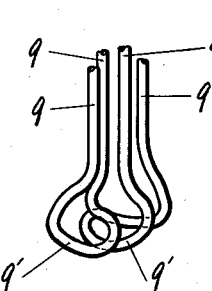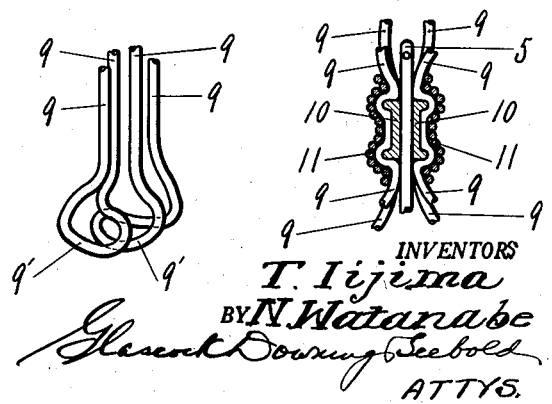

2,969,213
BAG-DEPLOYING TYPE PARACHUTE

Tsuneo Iijima, Shinjuku-ku, Tokyo-to, and Naoichi Watanabe, Hachioji-shi, Tokyo-to, Japan, assignors to Fujikura Koso Company Limited, a company of Japan Filed Oct. 30, 1957, Ser. No. 693,465

Claims priority, application Japan Nov. 26, 1956

4 Claims. (Cl. 244—148)

The present invention relates to the art of parachutes and more particularly to parachutes of the bag-deploying type.

A bag-deploying type parachute includes a bag in which the canopy is packed with the suspension lines disposed on the outer surface of the bag and an outer bag or pack enclosing the bag containing the canopy, with the outer pack being secured to a human body or to cargo. In the following description, the term "deployment bag" refers to a bag or container which is operatively connected to the static line.

In the commonly used deployment bag-type chutes, the deployment bag remains at the end of the static line while only the canopy falls, or, the deployment bag falls free of the aircraft, after its separation from the canopy.

In the situation where the static line and the deployment bag are left streaming from the aircraft following a drop, difficulties are encountered in controlling the aircraft, especially at high speeds, when a large number of static lines with deployment bags extend from the aircraft thus creating heavy drag. Furthermore, it is difficult to bring the static lines and bags into the aircraft during flight and this interferes with smooth flight operation.

In addition, in the case of parachutes where the deployment bag separates from the static line and canopy, the deployment bag is lost.

An important object of the present invention is to provide a deployment bag-type parachute which overcomes the above and other objectionable characteristics by including means whereby the deployment bag falls with the canopy.

More specifically, the parachute includes a special connector between the deployment bag and the static line which when operated allows the deployment bag to remain with the parachute canopy and only the static line remains with the aircraft following drops.

To accomplish the foregoing and other advantageous objects, the canopy is packed within the deployment bag and joined thereto by a webbing with the webbing being operatively associated with the static line by a connector. The canopy deploys from the bag and the action of the pulling forces of the canopy, at the time of full extension, removes the locking pin of the connector whereupon the deployment bag remains and falls with the canopy and the static line remains with the aircraft.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Fig. 1 is an elevational view showing the canopy packed in the deployment bag, with the bag being attached to the static line.

Fig. 2 is an elevational view showing the deployment bag and the apex area of the canopy following the release of the bag from the static line and the beginning of the opening movement of the canopy.

Fig. 3 is an elevational view showing the static line and that part of the connector remaining with the static line following the release of the deployment bag.

Fig. 4 is an elevational view of the component parts of the connector.

Fig. 5 is a view taken along the line A—A of Fig. 4, the view looking in the direction of the arrows.

Fig. 6 is a fragmental view of that component of the connector secured to the static line, and Fig. 7 is a vertical sectional view taken through the central zone of the connector shown in Fig. 4.

Referring to Fig. 1, there is illustrated a deployment bag 1 fabricated of any suitable material and parachute canopy 2 being folded within the bag. One end of a connector webbing 4 is attached to suspension lines 3 extending over the apex vent of the canopy (Fig. 2) and the other end of the webbing is secured within the bag 1. A locking pin 5 is carried by the webbing 4 at a point midway of the ends of the webbing and the function of the pin will later be more fully described.

A pair of tape loops 7, each being substantially D-shaped, are sewn or otherwise attached to the bag 1 over top opening 6 of the bag, and these loops function in the release operation of the bag. A connector 9 which cooperates with the loops 7 is conveniently attached to static line 8.

The connector 9 comprises two double braided cords 9, 9' and the cords are bound together at approximately their mid zone by threads 11 and as best shown in Fig. 7, a guide sleeve 10 is also held by the threads and the bore of the sleeve is adapted to receive the locking pin 5. Loops 9' are formed at the lower ends of the connector and the cords forming the lower loops are the same cords which form the upper loops.

In order to connect the deployment bag 1 to the static line 8, the locking pin 5 is passed through the opening 6 in the top of the bag. Each of the loops 9' is passed through the loops 7 of the bag 1 from opposite sides so that the loops 9' appear to suspend the bag 1 as best illustrated in Figs. 4 and 5. The loops 9' are then overlapped to define an opening and the letter X and the pin 5 is inserted in the opening and into the bore of the sleeve 10 of the connector (Fig. 7).

The locking operation is completed by pulling on the end loops 9' and the loops 7. The greater the stretching forces of the static line 8, the greater the forces applied to the end loops 9' and the loops 7 which grip the locking pin 5 thereby firmly joining the deployment bag 1 to the static line.

When the parachute assembly above described is dropped from the aircraft, the deployment bag 1 breaks free from the conventional outer pack 12 and the suspension line begins to deploy. After the complete extension of the suspension line, the canopy 2 starts to deploy, and, after the canopy extends, a pulling force is exerted upon the webbing 4 which withdraws the locking pin 5 from the connector 9. The downward pulling component can withdraw the pin 5 from the sleeve 10 with relative ease and such component frees the pin 5 from the end loops 9' and the D-loops 7. Manifestly, the release or the withdrawal of the locking pin 5 effects the disconnection between the deploying bag 1 and the connector 9 as can be clearly seen from Figs. 2 and 3. Hence, the bag 1 remains and falls with the canopy 2 while the static line 8 and the connector 9 stay with the aircraft.

By virtue of the invention and more particularly the relatively simple connector assembly, the objectionable characteristics and economic losses resulting from the use of the conventional deployment bag-type parachutes enumerated above are overcome. The essential components of the invention are few in number and the parachute can be easily and inexpensively manufactured.

Due to the connector disclosed, the deployment bag is assured of descent with the canopy and the bag can be recovered for further use and this is a marked improvement over the existing techniques which results in the loss of the bag when the same is freed both from the static line and the canopy.

The invention is not to be confined to any strict conformity with the showings in the drawings and changes and modifications can be made therein so long as such changes and modifications mark no material departure from the spirit and scope of the appended claims.

We claim:

1. The combination with an aircraft provided with a static line of a deployment bag containing a canopy and means operatively connecting the bag to the static line so that the bag falls with the canopy, such means including a connector attached to the static line, complemental connector means for the bag engageable with the connector of the static line to attach the deployment bag to the static line, a webbing secured at one end to the canopy and at the other end to the deployment bag and means securing the complemental connector means to the webbing intermediate the ends of the webbing so that the deployment of the canopy from the bag imparts a pulling component on the complemental connector means to disconnect the same from the connector attached to the static line whereupon the deployment bag falls with the canopy.

2. The assembly as claimed in claim 1 wherein the connector includes loops at the lower end thereof, further loops on the deployment bag, with the loops of the connector cooperable with the loops of the bag to form an opening comprised of the open bights of the loops and the complemental connector means includes a locking pin insertable in the opening with the stretching forces applied to said loops by the static line serving to grip the locking pin.

3. The assembly as claimed in claim 2 wherein the connector is provided with a bored sleeve above the loops in which the locking pin is lodged.

4. The combination with an aircraft provided with a static line of a deployment bag containing a canopy and means operatively connecting the bag to the static line so that the bag falls with the canopy, such means including looped elements connected at one end to the static line, a bored sleeve secured to the looped elements between the ends thereof, a webbing secured at one end to the canopy and at the other end to the inside of the bag, a locking pin secured to the mid-point of the webbing, the top of the bag having an opening therein through which the pin may pass and a loop on each side of the opening cooperable with the lower ends of the looped elements to form an aperture between the spaced bights of the oppositely reverted loops so that when the pin is inserted in the aperture and in the bored sleeve, the stretching forces applied to the lower ends and loops by the static line serve to grip the pin to attach the bag to the static line and upon the deployment of the canopy from the bag, the pulling component exerted upon the pin by the webbing secured to the canopy and bag withdraws the pin from the bored sleeve and aperture allowing the bag to drop with the canopy.

References Cited in the file of this patent
UNITED STATES PATENTS 2,439,318     Quilter _____ Apr. 6, 1948

FOREIGN PATENTS 698,579     France _____ Nov. 28, 1930
1,063,827     France _____ May 7, 1954
1,081,945     France _____ Dec. 23, 1954